United States Patent [19]

Sorimachi et al.

[11] Patent Number: 4,818,858

[45] Date of Patent: Apr. 4, 1989

[54] VISUAL SENSOR SYSTEM FOR PRODUCING STEREOSCOPIC VISUAL INFORMATION

[75] Inventors: Kanehiro Sorimachi, Yokohama; Tsuneaki Kadosawa, Ninomiya, both of Japan

[73] Assignee: Canon Kabushiki Kaisha, Tokyo, Japan

[21] Appl. No.: 208,857

[22] Filed: Jun. 14, 1988

Related U.S. Application Data

[63] Continuation of Ser. No. 922,814, Oct. 17, 1986, which is a continuation of Ser. No. 789,838, Oct. 2, 1985, abandoned.

[30] Foreign Application Priority Data

Oct. 25, 1984 [JP] Japan ................... 59-222896

[51] Int. Cl.$^4$ .................. G01J 1/20; H04N 13/00; B25J 5/00; B25J 19/00
[52] U.S. Cl. ..................... 250/201; 358/88; 901/1; 901/47
[58] Field of Search ........... 250/201, 558; 354/402, 354/403, 404; 358/3, 88, 91, 92, 225, 227; 901/1, 47

[56] References Cited

U.S. PATENT DOCUMENTS

| | | | |
|---|---|---|---|
| 2,955,156 | 10/1960 | Heilig | 350/146 X |
| 3,059,519 | 10/1962 | Stanton | 350/145 |
| 3,435,744 | 4/1969 | Stimson | 354/403 |
| 3,442,193 | 5/1969 | Pagel | 354/403 |
| 3,670,097 | 6/1972 | Jones | 350/538 X |
| 3,984,846 | 10/1976 | Gallagher et al. | 354/403 |
| 4,046,262 | 9/1977 | Vykukal et al. | 901/1 X |
| 4,559,555 | 12/1985 | Schoolman | 358/210 X |

*Primary Examiner*—David Mis
*Attorney, Agent, or Firm*—Fitzpatrick, Cella, Harper & Scinto

[57] ABSTRACT

A visual sensor system for producing stereoscopic visual information comprises two sensors arranged on a plane and spaced by a predetermined distance from each other, light emitting elements arranged in one of the sensors for emitting light to an object through an imaging lens of the one sensor, a photo-sensor arranged on the other sensor for sensing the light reflected by the object through an imaging lens of the other sensor and determining a convergence position of the object based on an incident position of the sensed light, a changing device for changing a convergence angle between the two sensor on the focusing plane by relatively changing the direction of the other sensor, and a controller for controlling the changing device to change the direction of the other sensor toward the convergence position of the object.

21 Claims, 4 Drawing Sheets

VISUAL SENSOR SYSTEM FOR PRODUCING STEREOSCOPIC VISUAL INFORMATION

This application is a continuation of application Ser. No. 922,814 filed Oct. 17, 1986 which is a continuation of Ser. No. 789,838 filed Oct. 21, 1985, now abandoned.

BACKGROUND OF THE INVENTION

1. Field of the Invention

The present invention relates to a visual sensor system for producing stereoscopic visual information, and more particularly to a visual sensor system which permits matching of cross-angles between sensors.

2. Description of the Prior Art

In a robotic machine which is to work in a three-dimension space, it is necessary to recognize, as stereoscopic visual information, an environment of a work object relative to a position of the robot. Because of this requirement, a plurality of imaging devices are mounted on the robot and a difference between images due to parallax is analyzed to obtain the stereoscopic visual information.

However, in this stereoscopic system, a long time is required to find out corresponding points of the same object in the plurality of images produced by the plurality of imaging devices.

Where the imaging devices are fixed, the degree of overlapping of image field changes depending on the distance to the object. Thus, where the imaging devices are fixed for a distant view field while the optical axes thereof are held in parallel, the overlapping in the near view field is small and the stereoscopic view field is narrow.

SUMMARY OF THE INVENTION

It is an object of the present invention to provide a visual sensor which can adjust a convergence angle at a high speed with a high accuracy, can determine an origin point to find out corresponding points on images produced by two imaging devices, can detect the convergence angle, and can bring an imaging lens to an in-focus position by detecting a distance to an object.

It is another object of the present invention to provide a visual sensor which has a uniform image range irrespective of the distance to the object so that a uniform magnification for an object image is maintained and stereoscopic recognition is facilitated.

It is a further object of the present invention to provide a visual sensor which can adjust the convergence angle with a high accuracy and has a mechanism to bring the imaging lens to an in-focus position based on the cross-angle.

It is an object of the present invention to provide a visual sensor system including, two visual sensor means, a light emitting means arranged on one of said visual sensor means for emitting a light to an object, a photosensor means arranged on the other visual sensor means for sensing the light reflected by the object for determining a convergence position of the object based on an incident position of the sensed light, a convergence angle changing means for changing a convergence angle between the two sensor means on a focusing plane by relatively changing a direction of the other sensor means, and a control means for controlling the convergence angle changing means by changing the direction of the other sensor means toward the convergence position of the object determined by the photosensor means.

It is an object of the present invention to provide a visual sensor system in which a plurality of visual sensors each having a convergence angle and display means are arranged and visual information obtained by the visual sensors is displayed on the display means.

DETAILED DESCRIPTION OF THE PREFERRED EMBODIMENTS

Figure 1:
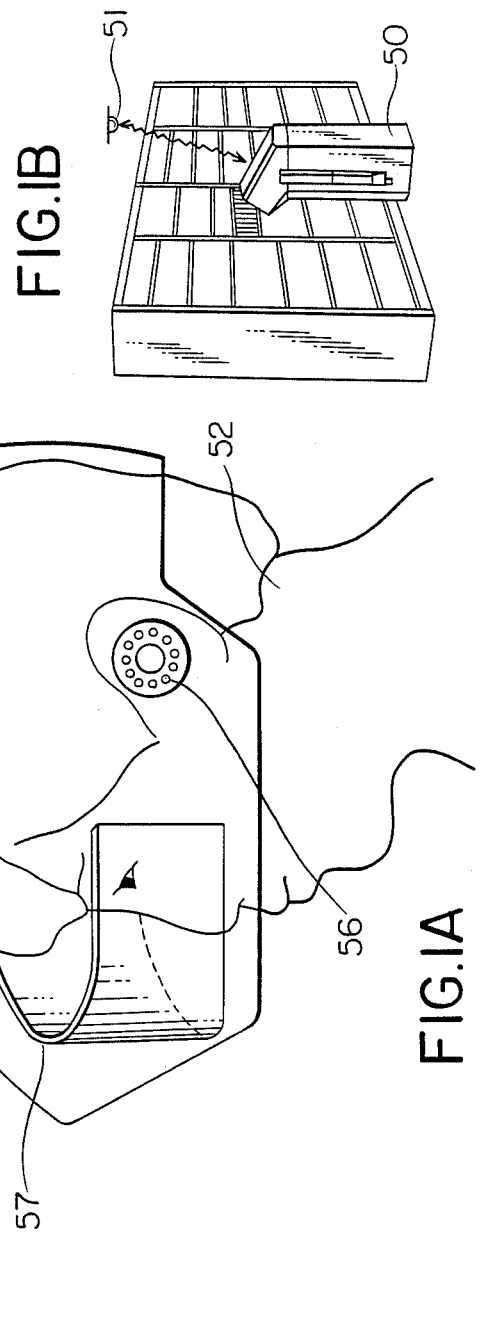
FIGS. 1A and 1B shows an application of a visual sensor system of the present invention.

FIGS. 1A and 1B show a system to which the present invention is applied. The visual sensor system of the present invention may be a single visual sensor or it may include a robot or an operation unit shown in FIG. 1B. Numeral 50 denotes a working robot having the visual sensor of the present invention. FIG. 1B shows a library robot. A robot for nuclear power generation plant or a high or low temperature site may also be used in the present invention. Numeral 51 denotes a light shower bilateral communication transmitter/ receiver. An operator 52, shown in FIG. 1A, is distant from the library robot 50 and controls the movement of the robot 50 and transportation of books by the robot 50. Numeral 53 denotes a robot control helmet having a display 57 corresponding to the eyes of operator 52, a light shower communication unit 55, a sensor 54 such as an optical fiber gyroscope for detecting position and orientation of the head and an earphone 56. The direction of the robot 50 can be changed in accordance with the movement of the head of the operator. A monitor T.V. having a large screen may be used instead of the helmet. By this system, the operator 52 moves the robot which mounts the visual sensor of the present invention thereon (by a remote control device or a joy stick, not shown), and a stereoscopic image 58 is displayed on the display 57 at positions facing the eyes of the operator. Two images are independently displayed at the positions facing the eyes of the operator in accordance with two visual sensors (FIGS. 3A and 3B).

Figure 2:
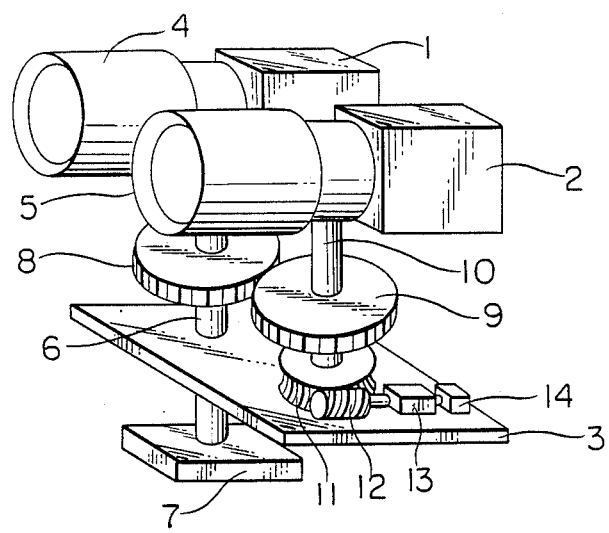
FIG. 2 is a perspective view showing a visual sensor construction of a convergence angle adjusting apparatus.

FIG. 2 shows an embodiment of the visual sensor of the present invention mounted on the working robot 50 shown in FIG. 1. Numeral 1 and 2 denote imaging devices arranged in parallel on a base plate 3, and numerals 4 and 5 denote lens systems having equal imaging characteristics, mounted on the imaging devices 1 and 2. Of the imaging devices 1 and 2, the imaging device 1 is fixed to support table 7 by a support shaft 6, and the base plate 3 is rotatably supported by the support shaft 6. Numeral 8 denotes a gear mounted on the support shaft 6 and numeral 9 denotes a gear mounted on a rotary shaft 10 of the imaging device 2. The gears 8 and 9 have the same number of teeth and mesh with each other. Numeral 11 denotes a worm wheel for rotating the rotary shaft 10, numeral 12 denotes a worm meshed with the worm wheel 11, and numeral 13 denotes a drive motor to which a rotary encoder is directly coupled to detect a rotation angle of a shaft of the motor 13.

Figure 3A:
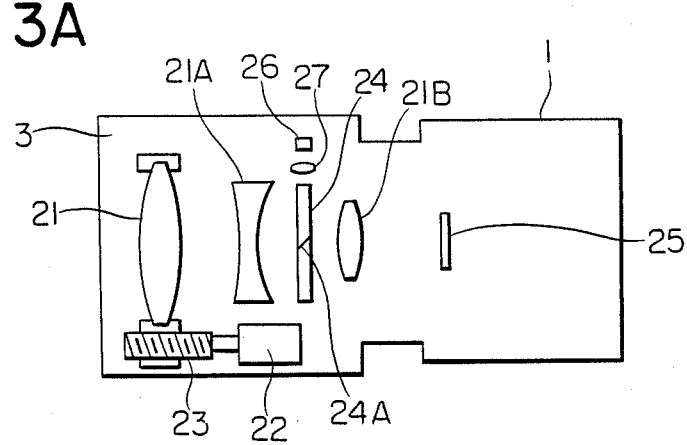
FIGS. 3A and 3B show in detail the optical systems of the visual sensors.
Figure 3B:
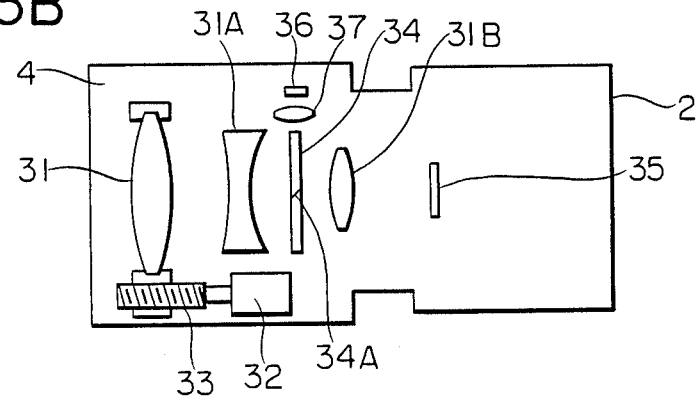
Figure 4:
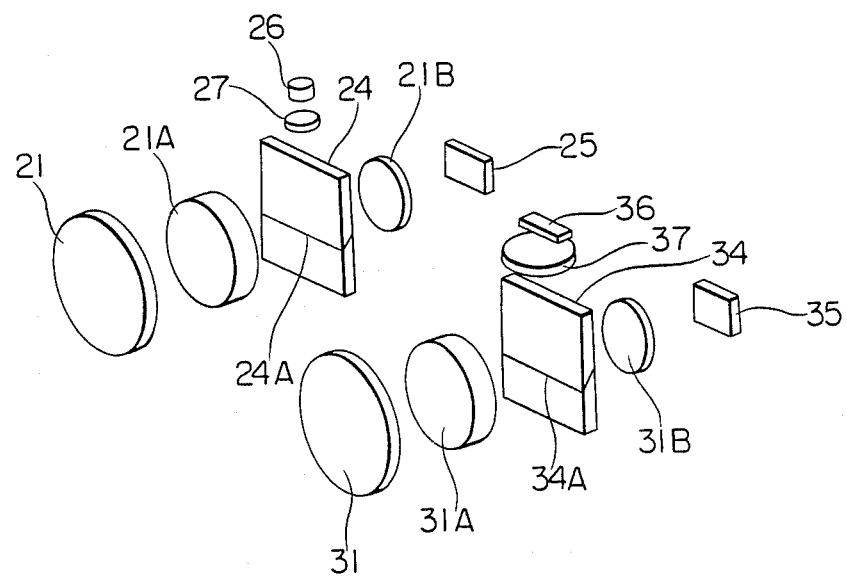
FIG. 4 is a perspective view of the optical system.

FIGS. 3A and 3B respectively show imaging mechanisms arranged in the imaging devices 1 and 2, and FIG. 4 shows optical systems thereof. Numeral 21 and 31 denote lenses which are movable along optical axes to allow focusing, and numerals 21A, 21B, 31A and 31B denote fixed lens. The lenses 21 and 31 are moved by lead screws 23 and 33 mounted on the shafts of the motors 22 and 32, respectively. Numeral 24 denotes a light splitter arranged between the lenses 21A and 21B, and numeral 34 denotes a light splitter arranged between the lenses 31A and 31B, the light splitter 24 and 34 have translucent mirrors 24A and 34A arranged in their light paths, respectively. Numerals 25 and 35 denote imaging elements.

In the first imaging device 1, shown in FIG. 3B numeral 26 denotes a light emitting device and numeral 27 denotes a lens arranged to bring the light emitting device 26 to an optically equivalent position to the imaging element 25. As a result, the light emitted from the light emitting device 26 is directed to the light splitter 24 through one end surface thereof, and reflected by the translucent mirror 24A, and the reflected light is directed to an object (not shown) through the lenses 21A and 21.

Numeral 36, shown in FIG. 3B, denotes a convergence adjustment sensor arranged in the second imaging device 2, and numeral 37 denotes a lens arranged to bring the sensor 26 to an optically equivalent position to the imaging element 35. The convergence adjustment sensor 36 is a photo-sensor device having photosensors arranged to sense the position information. For example, it is a one-dimension array sensor having photo-sensors arranged in one dimension.

The light emitted from the light emitting device 26 of the first imaging device 1 is directed to the object and reflected thereby, and the reflected light is directed to the translucent mirror 34 of the second imaging device through the lens 31 and 31A, and again reflected thereby and the reflected light is directed to the convergence angle adjusting sensor 36. If a convergence angle changes, an incident position on the one-dimension array sensor is shifted. In the present embodiment, when the convergence matches, the incident position is at a predetermined point on the array.

As an example, let us assume that the light emitted from the light emitting device 26 is projected to the center of the image area along the center line of the light of the lens mechanism 3 in the first imaging device 1, and when the convergence matches, the light reflected by the object is directed along the center line of the light of the lens mechanism 4 of the second imaging device and reflected by the reflection mirror 34A and the reflected light is directed to the center of the array sensor 36.

When the convergence angle adjusting device is started and the light from the light emitting device 26 of the first imaging device 1 is emitted in a beam, the light beam is reflected by the object which is on an extended line of the center line of the light of the lens mechanism 3, and a portion of the reflected light is directed to the array sensor 36 of the second imaging device 2.

If the convergence is such that both imaging devices are on the near side relative to the actual distance to the object, the incident position to the sensor 36 is displaced from the center toward the first imaging device 1, and if the convergence is such that both imaging devices are on the far side, the incident position is displaced away from the first imaging device 1. Accordingly, in order to match the convergence to the object, the imaging devices 1 and 2 are rotated in one or the other direction. Based on this determination, the drive motor 13 shown in FIG. 2 is driven to rotate the first and second imaging devices 1 and 2 so that the light incident position to the sensor 36 is moved to the center position.

Figure 5:
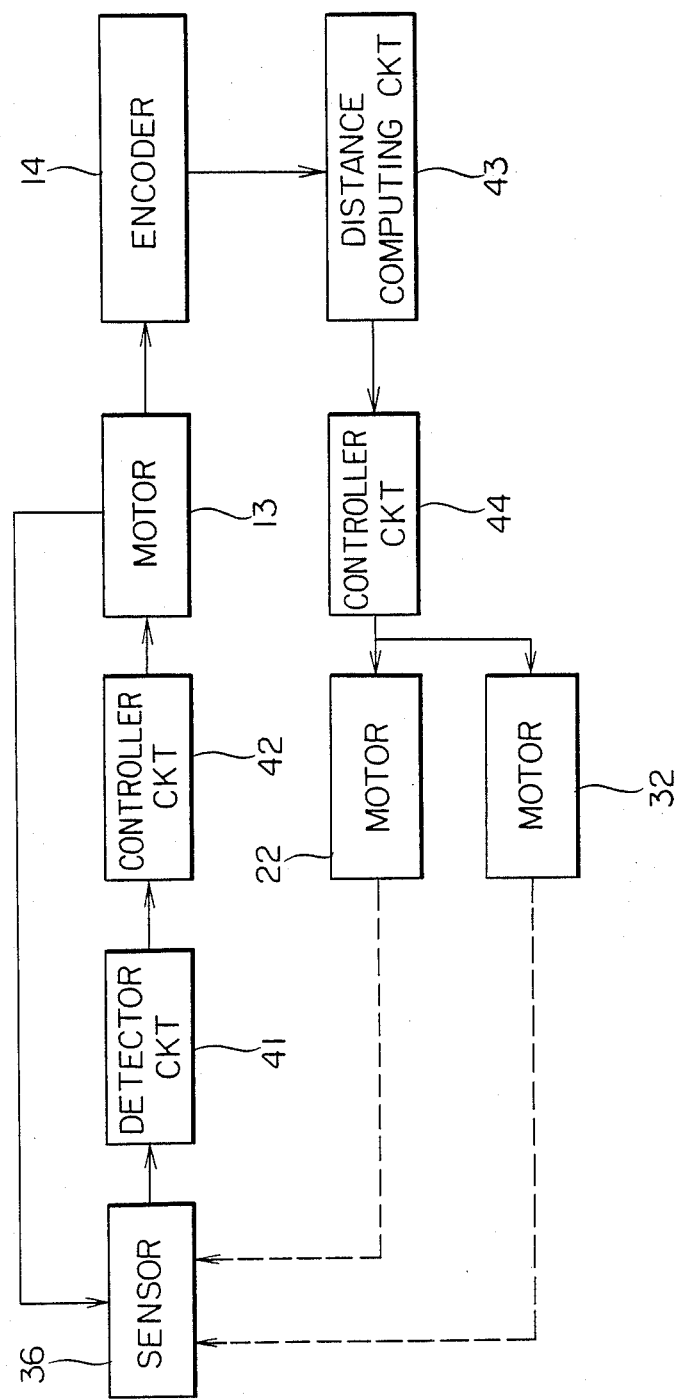
FIG. 5 is a block diagram of a control unit for the visual sensor convergence angle adjusting apparatus.

FIG. 5 shows a configuration of such a control unit. Numeral 41 denotes a detection circuit which detects the light incident position of the light emitted by the light emitting device 26 and directed to the line sensor and produces signals representing a distance and a direction of the displacement of the incident position. This signal is supplied to a control circuit 42 which generates a motor drive signal based on those signals to drive the motor 13 so that the incident position to the sensor 36 is moved to the center.

As the motor 13 is driven, the rotary shaft 10 of the second imaging device 2 is rotated through the worm gear in the direction to attain the convergence. Because the gear 9 meshes with the gear 8, the second imaging device 2 is rotated with the base plate 3 around the stationary shaft 6.

Through the relative movement of the imaging devices, the distances from the first and second imaging devices 1 and 2 to the convergence matching point can be always kept equal. The motor 13 is stopped when the light incident position to the sensor 36 reaches the center position as a result of such a motion. In this manner, the convergence matching point is attained on the object.

On the other hand, the rotation angle of the motor 13 is detected by the encoder 14. A distance calculation circuit 43 calculates the rotation angle of the second imaging device 2 based on the detected rotation angle of the motor, and calculates a distance to the convergence matching point of the object based on the rotation angle of the second imaging device and the known distance between the imaging devices.

The motors 22 and 32 are driven through the control circuit 44 such that the imaging lens is focused to the calculated distance to focus the first and second imaging devices 1 and 2 the convergence matching point.

As a result of such focusing, the light from light emitting device 26 which is arranged at optically equivalent position to the imaging element 25 can be focused onto the object, and the image of the light can be focused onto the sensor 36. Accordingly, the light image of the light emitting device 26 can be focused onto the sensor 36 with high accuracy.

This means that a shape of the light emitting area of the light emitting device 26 and a shape of a mask have a connection with the precision and easiness of the position detection by the sensor 36. It is preferable to use an infrared light emitting device, to frequency modulate the light to distinguish it from external light, or to use a laser device.

In the above description, the centers of the light emitting device 26 and the sensor 36 are aligned to the optical axes of the lens mechanisms 3 and 4, although such arrangement is not always necessary so long as the centers are at corresponding positions to the optical axes, respectively.

When the laser is used as the light emitting device, focusing of lens is not necessary to focus the beam spot onto the object, but as to the reflected light image onto the sensor, focusing is carried out to clarify the position.

A planetary motion in which the two imaging devices are rotated in the opposite directions to each other by the same angle can be substituted for the above example. In this case, the belt is crossed. In any case, through such motion to distance can be matched even for the object at a near distance, and the magnification can also be kept equal.

Since the rotation of the imaging devices outwardly to each other from the state in which the optical axes of both imaging devices are parallel is not necessary for the convergence, a stopper may be provided to inhibit such outward rotation.

The convergence angle can be detected by a resolver instead of the encoder. The lens mechanism may be an entire focusing system instead of the front lens focusing system. In this case, the light splitter may be moved to an appropriate position. The matching of the convergence angle and the focusing are independent from each other and carried out essentialy simultaneously.

In accordance with the present invention, two imaging devices are arranged on one plane and spaced by a predetermined distance from each other, with one imaging device being rotatable along the support axis of the other. Once one imaging device is provided with the light emitting device which emits the light beam to the object through the imaging lens, and the other imaging device is provided with the photosensor which senses the light reflected by the object, through the imaging lens, the far or near distance for the congestion to the object is determined based on the incident position of the light to the photosensor. Based on this determination, the two imaging devices are rotated so that the convergence matching point is moved to the object. Accordingly, the convergence matching is carried out with high precision. Further, the distance in the object is calculated based on the convergence angle to enable focusing. Accordingly, not only the light incident position on the photosensor can be precisely detected but also the light beam irradiation position on the object and the corresponding positions on both imaging devices are always kept in a unique positional relationship. Thus, the irradiation position can be handled as the corresponding positions on the images of both imaging devices and the amount of image processing is significantly reduced.

Further, the ranges of the images taken by both imaging devices and the images in the neighborhood thereof are essentially the same irrespective of the distance to the object, and the magnification of the image is kept equal. Accordingly, stereoscopic recognition is facilitated.

Alternatively, one imaging device may have a light emitting device for emitting a light beam and a photosensor to focus the imaging lens to the object, and the other imaging device may have light emitting device and photosensor. The matching of the convergence angle and the focusing may be carried out in any order or essentially simultaneously.

We claim:

1. A visual sensor system for producing stereoscopic visual information, comprising:
   two visual sensor means spaced by a predetermined distance from each other;
   light emitting means arranged on one of said two visual sensor means for emitting light to an object through an imaging lens of said one visual sensor means;
   photosensor means arranged on the other of said two visual sensor means for sensing the light reflected by the object and incident along the optical axis of an imaging lens of said other visual sensor means determining a convergence position of the object based on an incident position of the sensed light;
   convergence angle changing means for changing a convergence angle between said two sensor means on a focusing plane by relatively changing a direction of said other sensor means; and
   control means for controlling said convergence angle changing means so that the direction of said other sensor means is changed toward the convergence position of the object determined by said photosensor means.

2. A visual sensor system according to claim 1, wherein said control means changes the direction of both of said two sensor means toward the convergence position.

3. A visual sensor system according to claim 1, wherein one of said sensor means has at least light emitting means and the other sensor means has at least photosensor means.

4. A visual sensor system according to claim 1, wherein said changing means includes a motor and a worm gear.

5. A visual sensor system according to claim 1, wherein said photosensor means is a one-dimensional array sensor.

6. A visual sensor system according to claim 1, wherein said two sensor means each has means for focusing an imaging lens to the convergence position.

7. A visual sensor system for producing stereoscopic visual information, comprising:
   monitor means movable at least in the horizontal direction and having a plurality of visual sensors for monitoring remote points, convergence angle control means for controlling a convergence angle of said visual sensors, and means for performing focussing of said visual sensors on the remote points in accordance with the convergence angle controlled by said convergence angle control means;
   operation means for controlling the movement of said monitor means at least in the horizontal direction;
   said operation means including one display means for each of said visual sensors;
   and
   display control means for controlling said display means to display visual information produced by said visual sensors having the convergence angle thereof controlled by said convergence angle control means, on the corresponding display means.

8. A visual sensor system according to claim 7, wherein said monitor means is a robot having movable visual sensors.

9. A visual sensor system according to claim 7, wherein said display means are arranged so that a first and second of said display means is for viewing by each repsective eye of an operator, and the visual information produced by the two visual sensors are displayed.

10. A visual sensor system according to claim 7, wherein one of said visual sensors has at least photosensor means.

11. A visual sensor system according to claim 7, wherein said convergence angle control means includes motor means to change the directions of said visual sensors.

12. A visual sensor system according to claim 10, wherein said photosensor means is a one-dimension array sensor.

13. A visual sensor system for producing stereoscopic visual information, comprising:
- a plurality of input means for inputting image information pertaining to a viewed object, at least one of said plurality of input means having light emitting means for recognizing the distance to the object or the direction in which the object faces;
- a plurality of display means for displaying the image information input by said plurality of input means;
- control means for controlling said plurality of input means such that the scope of a field of vision of the image information input by each of said plurality of input means is made substantially equal to each other, and
- means for keeping the object in focus while said control means performs its control operations; and
- means for supplying the image information input by each of said plurality of input means to a corresponding one of said plurality of display means.

14. A visual sensor system according to claim 13, wherein each of said plurality of input means comprises means for obtaining image information from a three-dimensional object.

15. A visual sensor system accrording to claim 13, wherein said plurality of display means are two in number arranged for viewing by each respective eye of an operator, and the visual information produced by the two input means are displayed by said two display means.

16. A visual sensor system according to claim 13, wherein one of said plurality of input means includes photosensor means.

17. A visual sensor system according to claim 13, wherein said control means controls a convergence angle between said plurality of input means.

18. A visual sensor system according to claim 14, wherein said control means controls a convergence angle between said plurality of input means such that the scope of a field of vision of the image information obtained by each of said plurality of input means is made substantially equal to each other, regardless of the distance between the three-dimensional object and said plurality of input means.

19. A visual sensor system for producing stereoscopic visual information, comprising:
- a plurality of input means for inputting image informaiton;
- a plurality of display means for displaying the image informaiton input by said plurality of input means;
- means for detecting a direction to which an operator sees;
- first control means for controlling a direction of said input means in response to the direction of said operator detected by said detection means; and
- second control means for controlling said input means such that the scope of a field of vision of the image information input by each of said plurality of input means is made substantially equal to each other regardless of the distance between the position of said plurality of input means controlled by said first control means and an object which is in the direction controlled by said first control means and whose image is to be input by said input means, wherein said second control means controls a convergence angle of said plurality of input means at real time.

20. A visual sensor system according to claim 19, wherein each of said plurality of input means comprises means for obaining the image information from a three-dimensional object.

21. A visual sensor system according to claim 19, wherein said plurality of display means are two in number and said two display means are arranged so that a first and a second of said two display means is for viewing by each respective eye of an operator, and the visual information produced by said input means is displayed by said two display means.

* * * * *

UNITED STATES PATENT AND TRADEMARK OFFICE
CERTIFICATE OF CORRECTION

PATENT NO. : 4,818,858

DATED : April 4, 1989

INVENTOR(S) : Sorimachi et al.

It is certified that error appears in the above-identified patent and that said Letters Patent is hereby corrected as shown below:

[63] RELATED U.S. APPLICATION DATA
 Line 2, change "Ser. No. 789,838, Oct. 2, 1985" to --Ser. No. 789,838, Oct. 21, 1985--.

[57] ABSTRACT
 Line 12, change "sensor" to --sensors--.

COLUMN 1
 Line 17, change "dimension" to --dimensional--.

COLUMN 2
 Line 8, change "shows" to --show; and
 Line 54, change "Numeral 1 and 2" to --Numerals 1 and 2--.

COLUMN 3
 Line 5, change "Numeral 21 and 31" to --Numerals 21 and 31--;
 Line 8, change "fixed lens." to --fixed lenses.--;
 Line 13, change "light splitter 24" to --light splitters 24--;
 Line 17, change "FIG. 3B" to --FIG. 3A--;
 Line 34, change "one-dimension" to --one dimensional--;
 Line 40, change "lens 31 and 31A" to --lenses 31 and 31A--; and
 Line 43, change "one-dimension" to --one dimensional--.

COLUMN 5
 Line 19, change "essentialy" to --essentially--;
 Line 29, change "congestion" to --convergence--; and
 Line 35, change "in" to --to--.

UNITED STATES PATENT AND TRADEMARK OFFICE
CERTIFICATE OF CORRECTION

PATENT NO. : 4,818,858

DATED : April 4, 1989

INVENTOR(S) : Sorimachi et al.

It is certified that error appears in the above-identified patent and that said Letters Patent is hereby corrected as shown below:

COLUMN 6
    Line 40, change "focussing" to --focusing--;
    Line 47, change "sensors" to --sensors; and--;
    Line 48, delete "and";
    Line 59, change "and second" to --and a second--; and
    Line 60, change "repsective" to --respective--.

COLUMN 7
    Line 2, change "one-dimension" to --one-dimensional--; and
    Line 27, change "accroding" to --according--.

COLUMN 8
    Line 9, change "maiton" to --mation--;
    Line 11, change "informaiton" to --information--; and
    Line 31, change "obaining" to --obtaining--.

Signed and Sealed this

Thirteenth Day of March, 1990

Attest:

JEFFREY M. SAMUELS

Attesting Officer

Acting Commissioner of Patents and Trademarks